(No Model.)
L. T. BUCKLER.
ADJUSTABLE SPEED GEARING FOR BICYCLES.
No. 587,787. Patented Aug. 10, 1897.
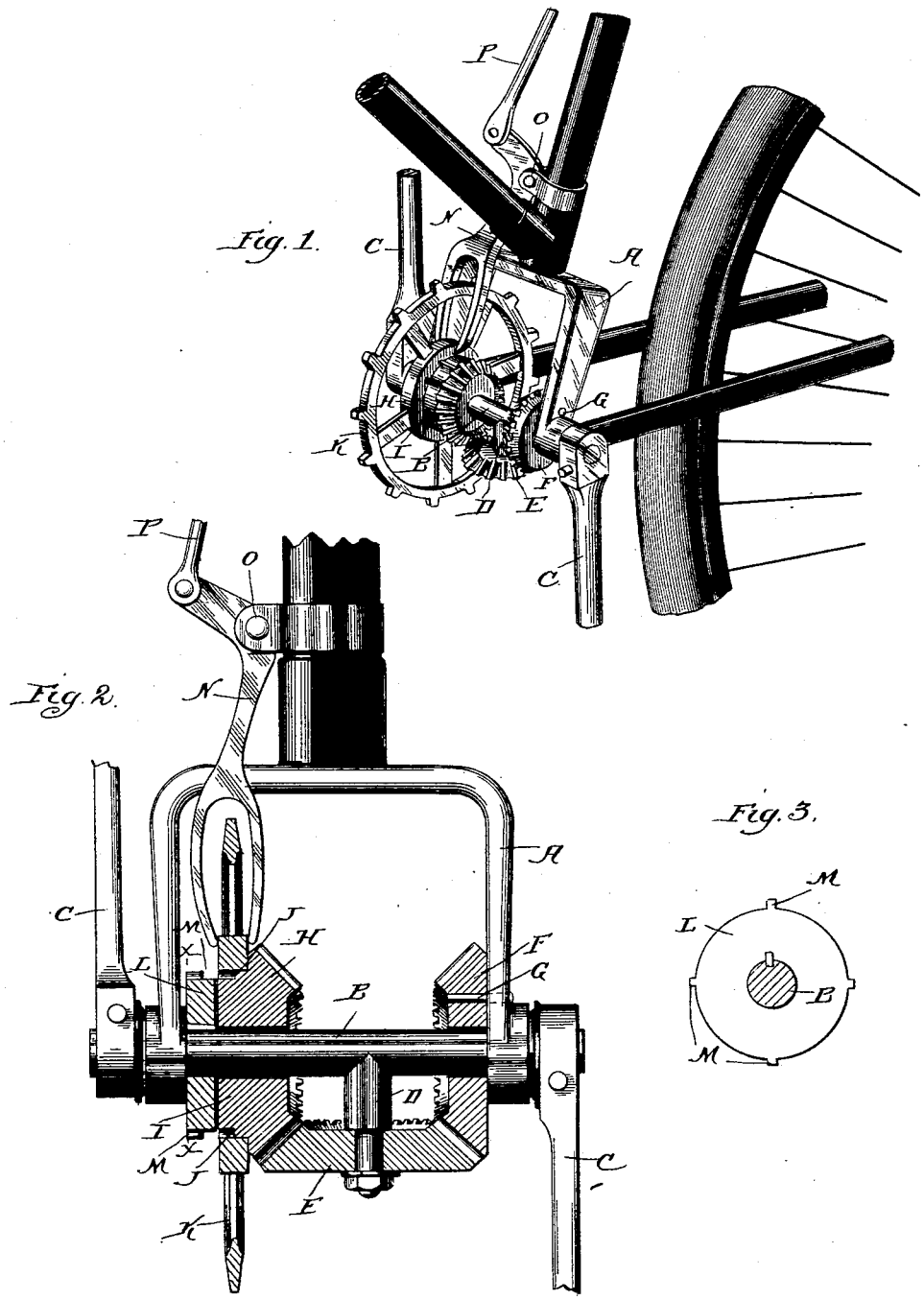
Witnesses:
H. B. Hallock.
S. T. Williamson
Inventor
Leon T. Buckler
by Geo. H. Holgate
Attorney.

UNITED STATES PATENT OFFICE.

LEON T. BUCKLER, OF PHILADELPHIA, PENNSYLVANIA.

ADJUSTABLE SPEED-GEARING FOR BICYCLES.

SPECIFICATION forming part of Letters Patent No. 587,787, dated August 10, 1897.

Application filed May 23, 1896. Serial No. 592,833. (No model.)

*To all whom it may concern:*

Be it known that I, LEON T. BUCKLER, a citizen of the United States, residing at Philadelphia, in the county of Philadelphia and State of Pennsylvania, have invented certain new and useful Improvements in Adjustable Gearing for Bicycles, of which the following is a specification.

My invention relates to a new and useful improvement in adjustable gears for bicycles; and it has for its object to provide a device whereby a bicycle may be quickly changed from one speed to another and when changed to the speed adapted for driving the bicycle over roads requiring the most power the extra gearing will be left idle, thus adding no friction and absorbing no power.

With these ends in view my invention consists in the details of construction and combination of elements hereinafter set forth, and then specifically designated by the claim.

In order that those skilled in the art to which this invention appertains may understand how to make and use the same, I will describe its construction and operation in detail, referring by letter to the accompanying drawings, forming a part of this specification, and in which—

Figure 1 is a perspective of my improvement as applied to a bicycle; Fig. 2, a central cross-section thereof; and Fig. 3, a section at the line *x x* of Fig. 2, showing the clutch which is keyed to the crank-shaft.

Referring to the drawings in detail, A represents a fork which depends from the frame of the machine and serves as the crank-shaft hanger and has journaled therein the crank-shaft B, carrying the usual cranks C upon the outer ends thereof, and with this shaft is formed an offset D, upon which is journaled a beveled gear E. A gear F, corresponding to the gear E in both diameter and pitch, is secured to one member of the fork by bolts G or otherwise, so as to mesh with the gear E, and a gear H, similar to the above-named gear, is loosely mounted upon the shaft and also meshes with the gear E. The hub I of the gear H is provided with ribs J, which serve as splines for engagement with suitable grooves formed in the hub of the sprocket-wheel K, which latter may be of ordinary construction, and by means of these splines is caused to revolve with the gear H when in engagement with the hub thereof. A clutch L is rigidly secured upon the shaft B by a suitable key and is also provided with ribs M, which correspond in size and shape to the ribs J in order that the grooves in the hub of the sprocket-wheel may be brought into engagement with said ribs M, when said wheel is passed into engagement with the clutch, for the purpose hereinafter set forth.

In order that the sprocket-wheel may be shifted from the hub of the gear H to the clutch L, and vice versa, I pivot a bifurcated lever N at O, the forked members of which project downward upon either side of the sprocket-wheel and embrace the hub of said wheel, so that when this lever is swung in one direction or the other the sprocket-wheel will be carried into engagement with either the hub I or the clutch L, as the case may be. The upper end of the lever N is connected by a rod P to suitable mechanism for swinging said lever, which is arranged within easy reach of the rider, this mechanism not being shown, as it forms no part of my invention.

From this description the operation of my improvement will be obviously as follows: Assuming that the sprocket-wheel is in engagement with the hub of the gear H, the revolving of the shaft B by means of the cranks will cause the gear E to revolve upon its axis once for every revolution of said shaft on account of its meshing with the stationary gear F, and these revolutions will be transmitted to the gear H one for one. Besides the motion thus transmitted to the gear H a complete revolution thereof will be effected by each revolution of the gear E with the shaft B, and these revolutions, added to the first-described revolutions, will cause the gear H to revolve twice to every revolution of said shaft, as is well understood in mechanical movements. Now since the sprocket-wheel revolves in unison with the gear H it will be seen that it will revolve in the ratio of two to one to the crank-shaft and in the same direction, and when this motion is transmitted to the rear sprocket, secured upon the driving-wheel of the machine, it is obvious that a high speed will be attained.

When occasion requires the application of a greater force to the driving-wheel relative to the amount of power exerted upon the pedals, the sprocket-wheel K is shifted from engagement with the hub I into engagement with the clutch L by the proper swinging of the lever N, as before described, when said sprocket-wheel will revolve in unison with the shaft B on account of said clutch being secured to said shaft. Thus but half the number of revolutions to a given number of revolutions of the crank-shaft will be imparted to the driving-wheel as when the sprocket-wheel was in engagement with the hub of the gear H. This, in accordance with the well-known principle of mechanics, will increase the applied power upon the driving-wheel in the same ratio as the speed thereof is decreased. By this arrangement it will be seen that a rider may without dismounting so adjust the gearing of the machine as to either give him great speed at the expense of power or great power at the expense of speed, thus enabling him to readily pass up steep grades or move at a rapid rate over road-beds offering little resistance.

One of the great advantages of my improvement is that the gearing which effects these changes occupies but little space and in no way interferes with the movements of bicycles as now constructed, and another advantage is that the extra gearing remains motionless when adjusted to the slowest speed, thereby absorbing no power, which facilitates the driving of the machine over rough roads or up steep grades.

Having thus fully described my invention, what I claim as new and useful is—

In combination with a bicycle, a fork depending from the frame thereof, a shaft journaled in the fork, cranks secured to the ends of the shaft, an offset in the shaft, a gear journaled thereon, a gear rigidly secured to one member of the fork with which the first-named gear meshes, a third gear loosely journaled on the shaft also meshing with the first-named gear, a hub formed with the third gear, ribs formed on the periphery of the hub, a circular clutch of the same diameter as the hub, ribs formed on the periphery of the clutch the clutch being arranged on the shaft close to the hub, a sprocket-wheel having a central opening to travel on the hub and clutch and having slots to be engaged by the ribs, a shifting-lever having a bifurcated end embracing the periphery of the sprocket and extending down to and lying on each side of the hub, said lever being pivoted to a collar on the frame, substantially as described.

In testimony whereof I have hereunto affixed my signature in the presence of two subscribing witnesses.

LEON T. BUCKLER.

Witnesses:
 S. S. WILLIAMSON,
 MARK BUFORD.